United States Patent [19] [11] 4,145,493
Petrille et al. [45] Mar. 20, 1979

[54] OXIDATION OF RUBBERY POLYMERIC HYDROCARBONS

[75] Inventors: Dennis G. Petrille, Naperville; George S. Culbertson, Downers Grove, both of Ill.

[73] Assignee: Standard Oil Company (Indiana), Chicago, Ill.

[21] Appl. No.: 856,357

[22] Filed: Dec. 1, 1977

[51] Int. Cl.² ............................................. C08F 8/06
[52] U.S. Cl. ...................................... 526/58; 526/19; 526/914
[58] Field of Search ................................ 526/58, 914

[56] References Cited

U.S. PATENT DOCUMENTS

| | | | |
|---|---|---|---|
| 3,329,667 | 7/1967 | Braude et al. | 526/58 |
| 3,350,362 | 10/1967 | Potts | 526/58 |
| 3,434,993 | 3/1969 | Mirabile et al. | 526/58 |
| 3,655,834 | 4/1972 | Wisseroth et al. | 526/58 |
| 3,756,954 | 9/1973 | Abbott et al. | 526/58 |
| 3,756,999 | 9/1973 | Stetter et al. | 526/58 |

Primary Examiner—William F. Hamrock
Attorney, Agent, or Firm—Fred R. Ahlers; Arthur G. Gilkes; William T. McClain

[57] ABSTRACT

Continuous oxidation of rubbery polymeric hyrocarbons by mixing an oxygen-containing gas and a hot solution of the polymer in an oleaginous solvent at the inlet to a spraying device and spraying the mixture into a hot chamber provides substantially instantaneous oxidation of the polymer and disengagement of gas and liquid and at least the same extent of oxidation as the time consuming oxidation accomplished by sparging such gas into a volume of stirred hot solution.

2 Claims, No Drawings

OXIDATION OF RUBBERY POLYMERIC HYDROCARBONS

TECHNICAL FIELD OF THE INVENTION

This invention relates to the continuous oxidation of a rubbery polymeric hydrocarbon to introduce a plurality of keto-carbonyl groups into the polymer molecules and more specifically pertains to such oxidation wherein a gas containing molecular oxygen and a hot solution, e.g., at a temperature above 150° C., of the rubbery polymeric hydrocarbon in an oleaginous solvent of lubricating oil viscosity are combined in a mixing sprayer, the resulting hot mixture of aerated solution of polymer is introduced into the upper portion of a heated vessel defining a chamber so that all or substantially all of the spray droplets avoid contact with inner sidewalls of the chamber, the oxygen depleted gas disengages from the falling droplets, the oxygen depleted gas is withdrawn from the top of the chamber, and the solution of keto-carbonyl containing rubbery polymeric material collecting at the bottom of the chamber is withdrawn therefrom.

The common oleaginous fluids used for lubricating oils and especially for automotive crankcase lubrication are either fractions of petroleum or synthesized organic esters. The petroleum derived lubricating oils are viscosity graded according to the Society of Automotive Engineers (SAE) and given SAE number designations starting with SAE 5W and proceeding from SAE 10W to SAE 50 in units of 10. The viscosities of such SAE viscosity graded petroleum derived oils are usually expressed in Saybolt Universal Seconds (SUS) at 100° F. and 210° F. The typical minimum SUS viscosities for each of such SAE viscosity grades are given in TABLE I.

TABLE I

| SAE Number | SUS at 100° F. | SUS at 210° F. |
|---|---|---|
| 5W | * | 39 |
| 10W | 190 | 46 |
| 20W | 330 | 54 |
| 30 | 530 | 64 |
| 40 | 800 | 77 |
| 50 | 1250 | 97 |

*No minimum SUS viscosity is set at 100° F. but rather a 4000 SUS is set as maximum viscosity at 0° F. for this oil. For comparison SAE 10W has at 0° F. a maximum viscosity of 12,000 SUS.

The organic ester synthetic oleaginous fluids useful as automotive lubricating oils are diesters of adipic acid, azelic acid, or sebacic acid esterified with $C_8$ to $C_9$ branched-chain mono-alcohols such as 2-ethylhexanol, or triesters based on 2-ethyl-2-hydroxymethyl-1,3-propanediol and said acids.

For use as solvent for the rubbery polymeric hydrocarbons to be oxidized according to this invention there can be suitably used either such petroleum fractions or such ester type synthetic oleaginous fluids having a viscosity of up to 54 SUS at 210° C.

In such continuous process the rubbery polymeric hydrocarbon is rapidly oxidized to its multi-keto-carbonyl in the short time between carburetting of the oxygen-containing gas and the disengagement of oxygen-depleted gas. It is indeed surprising that such short term contact between molecular oxygen and the solution of rubbery polymeric hydrocarbon introduces into the polymer molecules a number of ketocarbonyl groups greater than obtainable by sparging oxygen-containing gas into the stirred hot liquid solution of rubber polymeric hydrocarbon for a period of time in the range of from 2 up to 20 hours. Another benefit of the present inventive process over said sparging process is that, in spite of the introduction of a greater number of keto-carbonyl groups into the molecules of the rubbery polymer by the present process there is less degradation of the polymer, the viscosity index improving or thickening efficiency of the oxidized polymer is better even though the oxidized polymer has a lower shear stability. To be expected, the short time of contact between oxygen and the solution of rubbery polymeric hydrocarbon by the present inventive process results in a solution of multi-keto-carbonyl rubbery polymer less discolored than such solutions resulting from the air-sparging process.

All of the foregoing benefits represent a substantial technical advantage for the known utility of such solutions of oxidized rubbery copolymer.

Rubbery polymeric hydrocarbons of from a number average molecular weight ($\overline{M}_n$) of 10,000 (e.g. isobutylene polymer) up to 40,000 $\overline{M}_n$ (e.g. ethylene-propylene copolymers and terpolymers of ethylene, propylene and a diene) are generally known viscosity index (VI) improving agents for both petroleum derived and ester-type synthetic lubricant oils. However, the shear stability of the dissolved rubbery polymers is rather low and the VI improvement life becomes unacceptably short for modern day long in service use of lubricant oils. It is also generally known that such 10,000 to 40,000 $\overline{M}_n$ and higher molecular weight rubbery polymeric hydrocarbons when mechanically degraded (i.e., by mastication) and/or oxidized, although degraded in molecular weight become somewhat improved in shear stability and hence are better VI improvers when dissolved in said petroleum derived or synthetic lubricant oils.

Such oxidative improvement of the rubbery copolymers can be accomplished by mastication of the polymeric material in a Banburry Mixer in the presence of air or by sparging an oxygen-containing gas (e.g., air) into a solution of the rubber polymer in hexane, xylene or one of the above types of lubricant oils under suitable conditions of temperature and at atmospheric or elevated pressure in the absence or the presence of metal catalysts such as platinum-palladium group, as well as compounds (e.g., salts) containing one or more of copper, iron, cobalt, cadmium, manganese, vanadium, and the like metal oxidation catalysts. Such oxygen-sparging oxidation methods applied to the rubbery polymeric hydrocarbons are described in the prior art, for example, in U.S. Pat. Nos. 2,982,728; 3,316,177; 3,153,025; 3,365,449; and 3,544,520 among other publications. Such oxidations do cause substantial to severe molecular weight degradation of the rubber polymer molecules while introducing in them one or more of the —C═O types of groups, such as aldehydo-carbonyl, carboxylic acid and keto-carbonyl groups, in varying amounts of such groups per molecule of reduced molecular weight size.

The oxidized rubbery copolymers can also be chemically converted to still further improved oil-soluble lubricant oil addition agents. For example, the solution of the oxidized rubbery copolymer, according to U.S. Pat. No. 3,316,177, can be first reacted with maleic anhydride to form an adduct and the adduct reacted with an alkylene polyamine to form an oil-soluble addition agent which imparts sludge inhibiting and detergency properties to the petroleum derived and synthetic lubricant oils. Also the —COOH containing oxidized rubbery polymers can be reacted with amines to obtain improved oil-soluble addition agents of the amide type for lubricant oils.

Based on the Mannich Reaction developed prior to 1940, which first taught that cyclic and alicyclic hydrocarbons containing aldehydo- and/or keto-carbonyl groups could be condensed with primary or secondary amines or with both aldehydes and such amines to form nitrogen-containing derivatives. Others have more recently found that the oxidized rubbery polymers containing aldehydo- and/or keto-carbonyl groups could be similarly condensed with various primary or secondary amines or such amines and aldehydes to obtain as condensation products useful lubricant oil addition agents. The condensation of the oxidized rubbery polymers containing a plurality of keto-carbonyl groups with a primary or secondary amine to an aminated keto-carbonyl compound useful as lubricant oil addition agents is taught, for example, by U.S. Pat. No. 3,864,268. The condensation of the oxidized rubbery copolymer with both an aldehyde and a primary or secondary amine is taught, for example, by U.S. Pat. No. 3,872,019. This latter condensation product is believed to contain the group

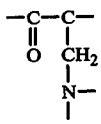

and is hereafter referred to as "keto-methylene amine."

We have become involved in the further development for commercial application of the foregoing aminated keto-carbonyl type and the keto-methylene amine type addition agents for lubricant oils because the former imparts VI-improvement and the latter imparts both VI-improvement and dispersancy properties to lubricant oils in which they are dissolved. As described in the above two patents the oxidized rubbery polymers are prepared by sparging an oxygen-containing gas into a hot oil solution of the 10,000 to 50,000 $M_n$ ethylene-propylene rubbery copolymer, preferably containing at least 140 pendant methylene groups per 1000 chain carbon atoms, under conditions which introduce a plurality of keto-carbonyl groups into the molecules of the polymer corresponding to an oxygen content in the range of from about 5 up to about 50 oxygen atoms per molecule. Such number of oxygens per molecule is an oxygen content in the range of from 0.056 up to 0.56 weight percent for the 10,000 $M_n$ polymer and from 0.014 up to 0.14 weight percent for a 40,000 $M_n$ polymer in solution containing 7 weight percent oxidized polymer dissolved in one of the before mentioned lubricant oil solvents.

We found that oxidation of the rubbery polymer by sparging air into a solution containing from 5 up to 15 weight percent polymer at a temperature of from 160° C. up to 215° C. required at least two and up to as much as eight hours to obtain an oxidized polymer of sufficient keto-carbonyl content to be useful as an intermediate for the preparation of the aminated keto-carbonyl or keto-methylene amine types of addition agents. But such long reactions also caused substantial discoloring of the resultant product and further diminished its VI improving properties.

A convenient manner of determining the extent of introduction of keto-carbonyl groups in the molecules is to determine the carbonyl absorbance units at 5.8 microns absorption peak measured by infra-red spectroscopic analysis (0.05 mm cell thickness) of the solution of oxidized rubbery copolymer. By air sparging of efficiently stirred 5 to 15 weight percent hot (180°–235° C.) oil solution of 30 or of 70 Mooney viscosity (ASTM method D-1646) rubbery polymer produces different levels of carbonyl absorbance units at said 5.8 micron peak per unit of time. The 70 Mooney viscosity rubbery polymer (60% ethylene and 40% propylene units) increases in carbonyl absorbance units reaching a maximum of about 14 (actual absorbance units × 100) in 130 minutes. No increase thereafter in said absorbance units are observed even though the air sparging is extended for an additional 80 minutes for a total of 210 minutes. The 30 Mooney viscosity rubbery polymer (60% ethylene and 40% propylene units) increases in carbonyl absorbance units much slower but continues to increase in such units reaching about 21 absorbance units (actual units 33 100) in 415 minutes. TABLE I below shows for said two ethylene-propylene polymers the typical increases in keto-carbonyl absorbance units (× 100) with time of air sparging. In said table the heading "Copolymer A" is used to indicate the 70 Mooney viscosity ethylene-propylene copolymer and the heading "Copolymer B" is used to indicate the 30 Mooney Viscosity ethylene-propylene copolymer. The data presented was obtained by air sparging a 9 weight percent stirred solution of Copolymer A at 182°–188° C. and a 10 weight percent stirred solution of Copolymer B at 188° C. The solvent for each solution is SAE 5W petroleum derived lubricating oil. Samples were taken of the oxidized solutions at the times indicated and submitted for infra-red spectroscopic analysis (0.05 mm cell).

TABLE I

| (2894–162) Copolymer A | | (HCM 74–14 FIGS. 1 and 4) Copolymer B (3006–21) | |
|---|---|---|---|
| Time, Minutes | Absorbance Units × 100 | Time, Minutes | Absorbance Units × 100 |
| 30 | 2.8 | 30 | 1.3 |
| 60 | 5.6 | 60 | 2.0 |
| 90 | 11.8 | 120 | 3.5 |
| 120 | 13.9 | 180 | 4.5 |
| 130 | 13.9 | 240 | 6.0 |
| 150 | 13.9 | 300 | 8.0 |
| 180 | 13.9 | 360 | 9.0 |
| 210 | 13.9 | 415 | 21.0 |

Results obtained from the present invention spray oxidation by air mixed with hot oil solutions of Copolymers A and B described above are shown in TABLE II. Also presented for the purpose of comparison are results obtained from the stirred air sparging of oil solutions of the same copolymers. In each type of oxidation a 9–10 weight percent solution of the copolymer in SAE 5W oil is used and the oxidation temperatures are 168° to 185° C. The oxidation time is not shown for the spray oxidations of the present invention because such time between mixing air with the hot oil solution (e.g., in a spray nozzle or atomizer) and gas disengagement from the solution in the heated tower is quite short, generally 2 to 5 seconds.

TABLE II

| Example | Copolymer | Air | Temp., °C | Absorb. Units × 100 | Time, Min. | Product Color Number | Product SUS Visc. at 99° C. |
|---|---|---|---|---|---|---|---|
| Comparative A | B 10% | Sparged | 188 | 9.5 | 315 | 6.0 | 3540 |
| Illustrative 1 | B 10% | Sprayed | 177 | 34.0 | | 1.5 | 3800 |
| Illustrative 2 | B 10% | Sprayed | 168 | 11.5 | | 1.5 | 7360 |
| Comparative B | A 9% | Sparged | 168 | 9.2 | 90 | 6.0 | 7600 |
| Comparative C | A 9% | Sparged | 182 | 10.2 | 100 | — | 6450 |
| Comparative D | A 9% | Sparged | 188 | 11.4 | 114 | 7.5 | 4960 |
| Illustrative 3 | A 9% | Sprayed | 188 | 45.0 | | — | — |
| Illustrative 4 | A 9% | Sprayed | 185 | 12.8 | | 2.5 | 5580 |

In TABLE II "Color Number" is a numerical value derived from a color scale wherein 0 is clear water-white and 10 is black and is a color scale of ASTM Method D 1500.

The different values for absorbance units × 100 for Illustrative Examples 1 to 4 resulted from different combinations of temperature and air to solution volume ratios used. This is illustrated in Table III below.

TABLE III

| | Temp. | Gas/Liquid (1/1) | Absorbance |
|---|---|---|---|
| Ex. 1 | 177° C. | 958 | 34 |
| Ex. 2 | 167° C. | 749 | 11.5 |
| Ex. 3 | 184° C. | >643 | 45 |
| Ex. 4 | 185° C. | 600 | 12.8 |

The absorbance units × 100 determined under the 5.8 micron peak is a qualitative, and not a quantitative, value indicative of the number of keto-carbonyls per molecule. Thus the higher absorbance units indicate a higher number of keto-carbonyl groups per molecule.

In Table IV to follow, there are presented additional data concerning the present inventive continuous oxidation of copolymer A of 70 Mooney viscosity more completely described before. In these oxidations a 7 weight percent solution of Copolymer A in SAE-5W hydrocarbon oil at the solution flow weight rates and temperatures indicated are mixed with 3800 cc per minute of air diluted with an equal volume of nitrogen gas (50/50 air/$N_2$) at a gauge pressure of 1.83 kg/cm$^2$ before entering the sprayer.

TABLE IV

| Solution Flow Rate, gms/min. | Temp., °C. | Absorbance Units × 100 | SUS Visc. at 99° C | Color No. | Product Wt. %* | Copolymer Oxidized Wt. % |
|---|---|---|---|---|---|---|
| 6.6 | 182 | 2.8 | 3820 | <2 | 6.0 | 56 |
| 5.4 | 182 | 2.8 | 3690 | <2 | 6.7 | 59 |
| 4.1 | 177 | 2.5 | 5090 | <2 | 5.3 | 56 |
| 6.6 | 188 | 3.6 | 2940 | <2 | 7.0 | 57 |
| 5.4 | 188 | 3.5 | 3160 | <2 | 6.9 | 64 |
| 4.1 | 188 | 4.0 | 2760 | <2.5 | 8.6 | 63 |
| 6.6 | 193 | 4.7 | 2190 | 2 | 8.4 | 67 |
| 5.4 | 193 | 4.1 | 2410 | <2.5 | 8.7 | 71 |
| 4.1 | 193 | 5.6 | 2180 | <3 | 10.1 | 72 |

*"Product, wt. %" is the concentration of oxidized copolymer in the recovered solution.

The above data indicate the interrelation of solution flow rate with temperature at constant oxygen rate supply as well as the ability of the present inventive process to make products to satisfy various product needs.

For comparison 7 weight percent Copolymer A dissolved in SAE-5W oil (4800 grams of solution) containing an oxidation catalyst which inhibits discoloration is stirred and sparged, oxidized with air, diluted with nitrogen (47% air – 53% nitrogen), fed into the solution heated to 182°–188° C. at a gas rate of 3400 cc per minute for 150 to 180 minutes. The product solutions (without separation of the catalyst, discoloration inhibitor) have the following typical properties.

TABLE V

| SUS Viscosity at 99° C | 2000 to 2150 |
|---|---|
| Color No. | <2 |
| Product wt. % | 4.5 to 5.5 |
| Absorbance Units × 100 | 1.3 to 1.6 |
| Copolymer Oxidized, wt. % | 40 to 50 |

From prior to 1940, it has been known that in the Mannich Reaction an aliphatic hydrocarbon having a keto-carbonyl carbon atom in the chain can be reacted with a primary or secondary amine or an aldehyde and a primary or secondary amine ("Organic Reactions", Vol. I, Chapter 10, 1942 Edition). Such reaction occurs with the chain carbon atom immediately adjacent to (carbon alpha to) the keto-carbonyl carbon atom in the chain due to the activation of such alpha carbon by the keto-carbonyl group.

The present inventive oxidation method rapidly introduces a greater number of keto-carbonyl groups in the molecules of the oxidized high molecular weight (10,000 $\overline{M}_n$ and above) rubber polymer than would be provided by the slower prior art sparging of stirred solution of such rubbery polymer. The greater number of carbonyl groups introduced in turn has as the technical effect of providing a greater number of alpha-chain carbon atoms reactive with the primary or secondary amine for the production of aminated keto-carbonyl derivatives of olefin copolymers according to U.S. Pat. No. 3,864,268 or reactive with both an aldehyde and a primary or secondary amine to produce the keto-methylene amine derivatives of the olefin co- and ter-polymers according to U.S. Pat. No. 3,872,019. The products of said patents impart to lubricant oils containing such products detergency (i.e., cleaning of lubricated surfaces) and dispersancy (suspension of oil-insoluble combustion products) as well as functioning as VI improvers. Since detergency comes from the introduced keto-amine function and dispersancy comes from the introduced keto-methylene amine function, the ability of the present inventive spray oxidation to provide a greater number of sites for introducing such functions affords oxidized polymers as intermediates for the production of more active detergent — VI improvers and dispersant VI improver lubricant oil addition agent.

The spray oxidation process of the present invention can be conducted by charging the oxygen-containing gas (e.g., air or air diluted with inert gas) and oil solution of the rubbery polymeric hydrocarbon both preheated to reaction temperature of from 160° C. up to 215° C. to the suction side of an aspirating nozzle or atomizing spray head which discharges into a spray receiving chamber heated to a temperature above 100° C. having a bottom liquid gathering portion and a top system for exhaust of oxygen depleted gas through a reflux condenser to cool the exhaust and condense therefrom components of the oil solvent vaporized at said 160° to 215° C. temperature range before the oxygen depleted gas is vented to the atmosphere. For rapid disengagement of oxygen depleted gas from the drops or droplets of viscous solution it is preferred that the chamber be also maintained at said temperature range of 160°–215° C. To avoid discoloration of the solution and polymer weight degradation it is desirable that all or substantially all of the spray droplets avoid contact with inner sidewalls, of the heated chamber. For operation of the present inventive process in a continuous manner, the bottom gathering portion and lower wall portion of the spray chamber need be heated only prior to starting the process. Thereafter introduction of the hot spray will keep the inner atmosphere of the chamber at or near the preferred temperature provided the spray chamber is properly insulated to minimize heat loss. The minimum height of the spray chamber for spray droplet fall can be readily determined by an engineer skilled in the design of spray drying towers from the size of droplet produced by the spray head selected and knowing that the time between mixing the solution with oxygen-containing gas and disengagement of oxygen depleted gas from the solution after leaving the nozzle or atomizer is but 2 to 5 seconds. The bottom liquid gathering portion of the spray chamber functions as a sump for removal, by gravity flow or by pumping, of the solution of oxidized rubber polymeric product from said chamber as a source of intermediates for preparation of the aminated ketone or the keto-methylene amine lubricant oil addition agents.

What is claimed is:

1. A method of oxidative molecular weight degradating an ethylene-propylene copolymer of average number molecular weight in the range of from 10,000 up to 40,000 and introducing into the resulting lower molecular weight molecule entities a plurality of keto-carbonyl groups which comprises heating a solution of from 5 up to 13 weight percent of said copolymer in an oleaginous solvent to a temperature in the range of from 160° C. up to 215° C., adding to said heated solution a gas containing molecular oxygen in the aspirating or suction side of a means for spraying fluids, spraying such mixture into a chamber maintained at a temperature of from 160° C. up to 215° C. to disengage oxygen depleted gas from the resulting solution and recovering the gas-free solution.

2. The method of claim 1 wherein the spray discharge is of a pattern such that all or substantially all of the spray droplets do not contact the inner walls of the spray receiving chamber.

* * * * *

UNITED STATES PATENT OFFICE
CERTIFICATE OF CORRECTION

Patent No. 4,145,493            Dated March 20, 1979

Inventor(s) Dennis G. Petrille and George S. Culbertson

It is certified that error appears in the above-identified patent and that said Letters Patent are hereby corrected as shown below:

| Col. | Line | | | |
|---|---|---|---|---|
| Title Page | | | | |
| Abstract | 18 | hyro- | hydro- | Patent Office Errors |
| 1 | 57 | 210°C | 210°F | " |
| 3 | 45 | $M_n$ | $\overline{M}_n$ | " |
| 3 | 54 | $M_n$ | $\overline{M}_n$ | " |
| 3 | 55 | $M_n$ | $\overline{M}_n$ | " |
| 4 | 25 | units 33 100 | units x 100 | " |
| 6 | 33 | prior art | prior air | " |
| 6 | 33 | rubber polymer | rubbery polymer | Patentees' Errors |
| 8 | 8 | rubber polymeric | rubbery polymeric | "    " |

Signed and Sealed this

Twenty-third Day of October 1979

[SEAL]

Attest:

RUTH C. MASON
*Attesting Officer*

LUTRELLE F. PARKER
*Acting Commissioner of Patents and Trademarks*